(12) United States Patent
Okuyama

(10) Patent No.: US 7,424,349 B2
(45) Date of Patent: Sep. 9, 2008

(54) SPEED DISPLAY DEVICE FOR A VEHICLE

(75) Inventor: Takashi Okuyama, Hamamatsu (JP)

(73) Assignee: Yamaha Marine Kabushiki Kaisha, Shizuoka-Ken (JP)

( * ) Notice: Subject to any disclaimer, the term of this patent is extended or adjusted under 35 U.S.C. 154(b) by 346 days.

(21) Appl. No.: 10/983,354

(22) Filed: Nov. 8, 2004

(65) Prior Publication Data
US 2005/0102088 A1 May 12, 2005

(30) Foreign Application Priority Data
Nov. 6, 2003 (JP) ............................. 2003-376777

(51) Int. Cl.
*G01C 21/10* (2006.01)
(52) U.S. Cl. .................. 701/1; 340/441; 701/70
(58) Field of Classification Search .................. None
See application file for complete search history.

(56) References Cited

U.S. PATENT DOCUMENTS

| | | | | |
|---|---|---|---|---|
| 3,871,715 A | * | 3/1975 | Hikida et al. ................ 303/172 |
| 4,821,567 A | * | 4/1989 | Nakamura et al. ............. 73/182 |
| 4,914,945 A | * | 4/1990 | Nakamura et al. ............. 73/182 |
| 5,007,286 A | * | 4/1991 | Malcolm et al. ............... 73/181 |
| 5,579,230 A | * | 11/1996 | Lin et al. ...................... 701/70 |
| 5,700,171 A | * | 12/1997 | Horton ......................... 440/87 |
| 6,438,506 B1 | * | 8/2002 | Yohpe et al. ................. 702/145 |
| 6,517,396 B1 | * | 2/2003 | Into ............................. 440/84 |
| 6,966,223 B2 | * | 11/2005 | Yamazaki et al. ............. 73/489 |
| 7,110,908 B2 | * | 9/2006 | Boucher et al. ............. 702/142 |
| 7,174,241 B2 | * | 2/2007 | Tsuruhara et al. .............. 701/1 |

FOREIGN PATENT DOCUMENTS

| | | | |
|---|---|---|---|
| JP | 8-320331 | * | 12/1996 |
| JP | 2000-162221 | * | 6/2000 |

* cited by examiner

*Primary Examiner*—Michael J. Zanelli
(74) *Attorney, Agent, or Firm*—Knobbe Martens Olson & Bear LLP (57) ABSTRACT

A vehicle speed display device includes a plurality of speed sensors of different types for detecting the speed V of a vehicle by different detection methods. A selector mechanism accesses error maps associated with each of the speed sensors that reflects inaccuracies characteristic of the associated speed sensors under various conditions, such as at various speed and/or at various acceleration levels. The selector selects a speed value associated with a minimum error value for the current moving state conditions and the selected speed value is displayed to an operator of the vehicle.

23 Claims, 5 Drawing Sheets

SPEED DISPLAY DEVICE FOR A VEHICLE

BACKGROUND OF THE INVENTION

1. Priority Information

This application claims priority benefit under 35 U.S.C. § 119 to Japanese Patent Application No. 2003-376777, filed Nov. 6, 2003, the entire contents of which are hereby expressly incorporated by reference.

2. Field of the Invention

The present invention relates to a vehicle speed display device and, more particularly, to a speed display device that selects a speed value to display based on a plurality of detected speed values detected by a plurality of speed sensors of different types.

3. Description of the Related Art

A variety of devices that use different methods for detecting the speed of a moving vehicle, such as a boat, are known. For example, one device detects the moving (propulsion) speed of the boat using a radio wave signal from a global positioning system (GPS). Another device for detecting the speed of a boat is a paddle wheel type speed sensor, which has a paddle wheel that is rotated by the resistance of a water flow created when the boat is propelled. The moving speed of the boat can be detected by detecting the rotational speed of the paddle wheel. Another device for detecting the moving speed of a boat uses a picot tube.

Due to variations and errors rates in devices, different types of moving speed detection devices may detect different detected speed values for the same moving vehicle at the same time. In an attempt to make allowance for this fact, one existing speed display device includes a plurality of speed sensors that use different methods to detect the vehicle's moving speed, such as, for example, three different sensors, and a display that displays all of the speed values detected by the plurality of speed sensors. An operator of the boat or other vehicle can therefore see the various detected speed values of varying accuracies on the display.

Each of the sensors performs more accurately under different moving state conditions, such as at different speeds and/or at different levels of acceleration. Thus, when speed values of the boat are displayed on the display based on the detected speed values detected by the three speed sensors, the speed values often do not coincide with one another. Some of the detected speed values detected by the speed sensors may be close to the actual speed of the boat. It is, however, difficult for the operator to determine which of the displayed speed values is close to the actual speed value unless the operator is highly skilled. The interplay of effects of speed and acceleration on the accuracy of vehicle speed sensors is something that would be difficult for a normal operator of a vehicle to assess while maneuvering the vehicle. Thus, it is difficult in general for the operator to determine the accurate moving speed of the boat based on the displayed speed values, and maneuvering the boat or other vehicle may be more difficult and/or dangerous.

SUMMARY OF THE INVENTION

The present invention has been made in view of the above circumstances and with the recognition that different types speed sensors perform more accurately than others under given moving state conditions, such as when the vehicle is traveling at different speeds and/or at different levels of acceleration. As will be later described in greater detail, average error levels of a given type of sensor may be mapped and thus predicted for a variety of moving state conditions. In accordance with one aspect of the present invention, a speed display device receives sensor input regarding current detected speed values for a vehicle and uses current vehicle moving state information together with stored information about known levels of estimated error associated with various sensors to automatically select a most accurate speed level to display to an operator of the vehicle, thus providing an important service to the operator. The operator thus need not guess which of a variety of displayed speed values is most accurate for purposes of making maneuvering decisions.

A map is provided that contains average error values associated under various moving state conditions with speed values detected by each different type of speed sensor included in the vehicle speed display device. In at least some embodiments, each error map is stored in a control unit that is in communication with the associated speed sensor. The control units are connected using a local area network (LAN). Thus, each of the maps, together with its associated speed sensor, may be easily removed, if desired. Furthermore, one or more additional speed sensors and associated maps may be added to the vehicle speed device, if desired. This is advantageous because the speed display device may be easily modified.

In various embodiments, the minimum error is selected from the errors in the maps corresponding to the detected speed values detected by the speed sensors or based on an arithmetic value calculated from at least two of the detected speed valued detected by the speed sensors. The speed value corresponding to the minimum error is displayed as the moving speed of the vehicle.

Since conditions such as the current moving speed or acceleration of the vehicle are taken into account when the moving state detector selects one of the detected speed values, a detected speed value with high accuracy can be selected. This is advantageous for the operator of a boat or other vehicle in maneuvering the vehicle.

Another aspect of the present invention a vehicle speed display device that comprises a plurality of moving state detectors for detecting the moving state of a vehicle using different detection methods. The vehicle speed display device also comprises a selector system for selecting a speed value for display to an operator of the vehicle. The selected speed value is determined by the selector system to accurately represent the moving speed of the vehicle and is based at least in part on the moving state information detected by the plurality of moving state detectors. The vehicle speed display device further comprises a display that displays the selected speed value to the vehicle's operator.

In accordance with an additional aspect of the present invention, a vehicle speed display device comprises at least two speed sensors, each sensor detecting a detected speed value for a vehicle. A selector system selects a single speed value determined to be representative of an accurate moving speed of the vehicle based at least in part on the detected speed values, and a display device displays the single displayed speed value.

A further aspect of the present invention involves a method for displaying a displayed speed value of a vehicle. The method comprises receiving from each of a plurality of speed sensors a detected speed value for a vehicle; determining a single displayed speed value for said vehicle based at least in part on said received detected speed values, and displaying said single displayed speed value to an operator of said vehicle.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements various features of specific embodiments of the invention will now be described with reference to the drawing. The drawing and the associated descriptions are provided to illustrate embodiments of the invention and not to limit the scope of the invention.

DETAILED DESCRIPTION OF THE PREFERRED EMBODIMENTS

Description will be hereinafter made of the embodiments of the present invention with reference to the accompanying drawings. The numerals and symbols attached to the terms are not intended to limit the scope of the present invention.

Figure 2:
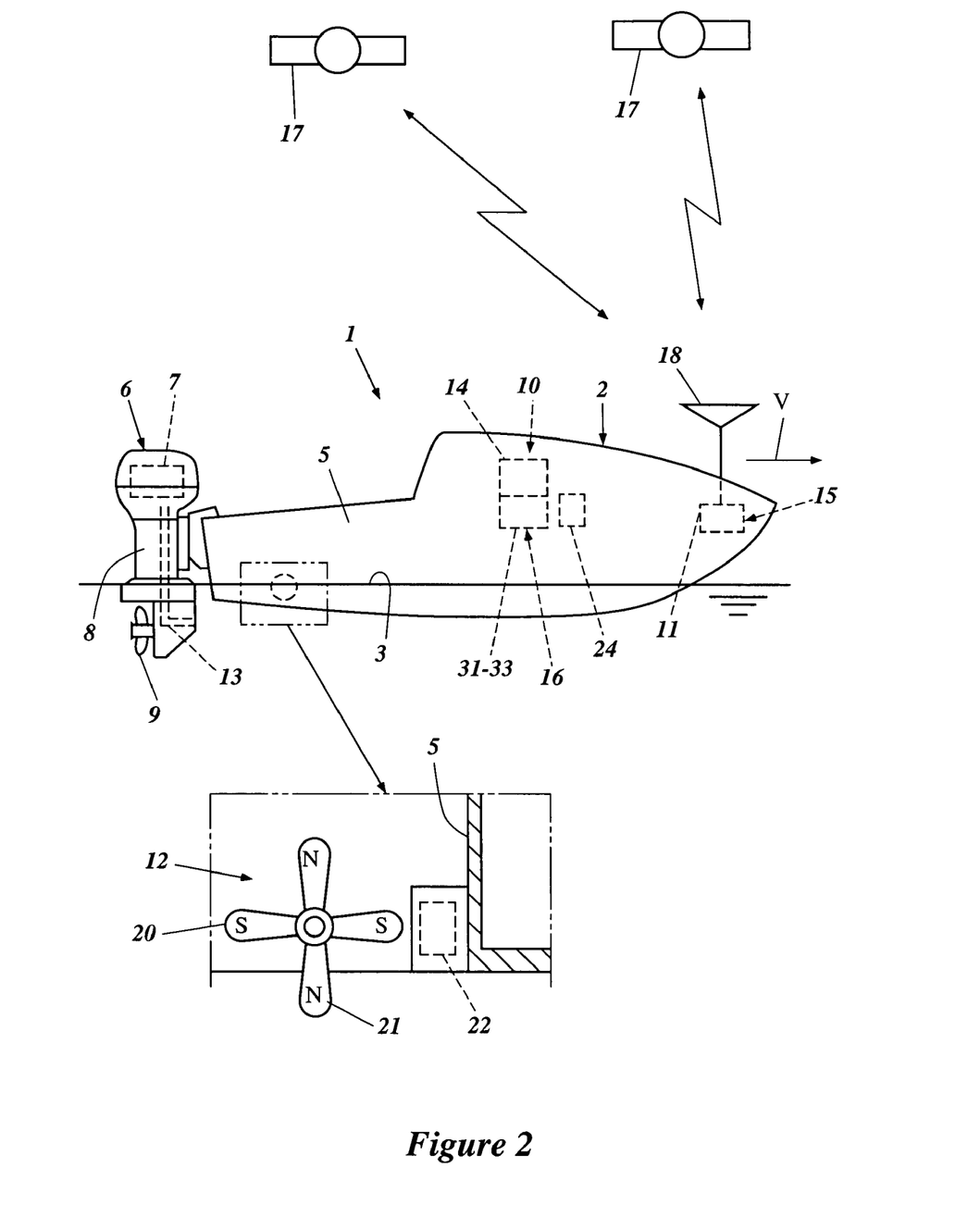
FIG. 2 is a schematic side view of a watercraft that includes the speed display device of FIG. 1.

FIG. 2 depicts one embodiment of a vehicle 1 that includes a speed display device 10 as described herein. In the example illustrated in FIG. 2, the vehicle 1 is a watercraft 2, and, more specifically, a planning boat, that floats on the surface of water 3. In other embodiments, the vehicle 1 may be another type of watercraft, an automobile, a motorcycle, a snowmobile or any of a variety of other types of vehicles, as will be familiar to one of ordinary skill in the art.

As depicted in FIG. 2 the boat 2 has a hull 5 that floats on the surface of the water 3 and an outboard motor as a propulsion unit 6 that is supported by a rear part of the hull 5 for propelling the hull 5. The propulsion unit 6 has an internal combustion engine 7, a power transmission unit 8, and a propeller 9.

The boat 2 has a speed display device 10 for detecting moving state information about the boat 2, for selecting a speed value based at least in part on the moving state information about the boat 2, and for displaying the selected speed value as the moving speed (propulsion speed) V (m/s) of the boat 2 to an operator of the boat 2.

Figure 1:
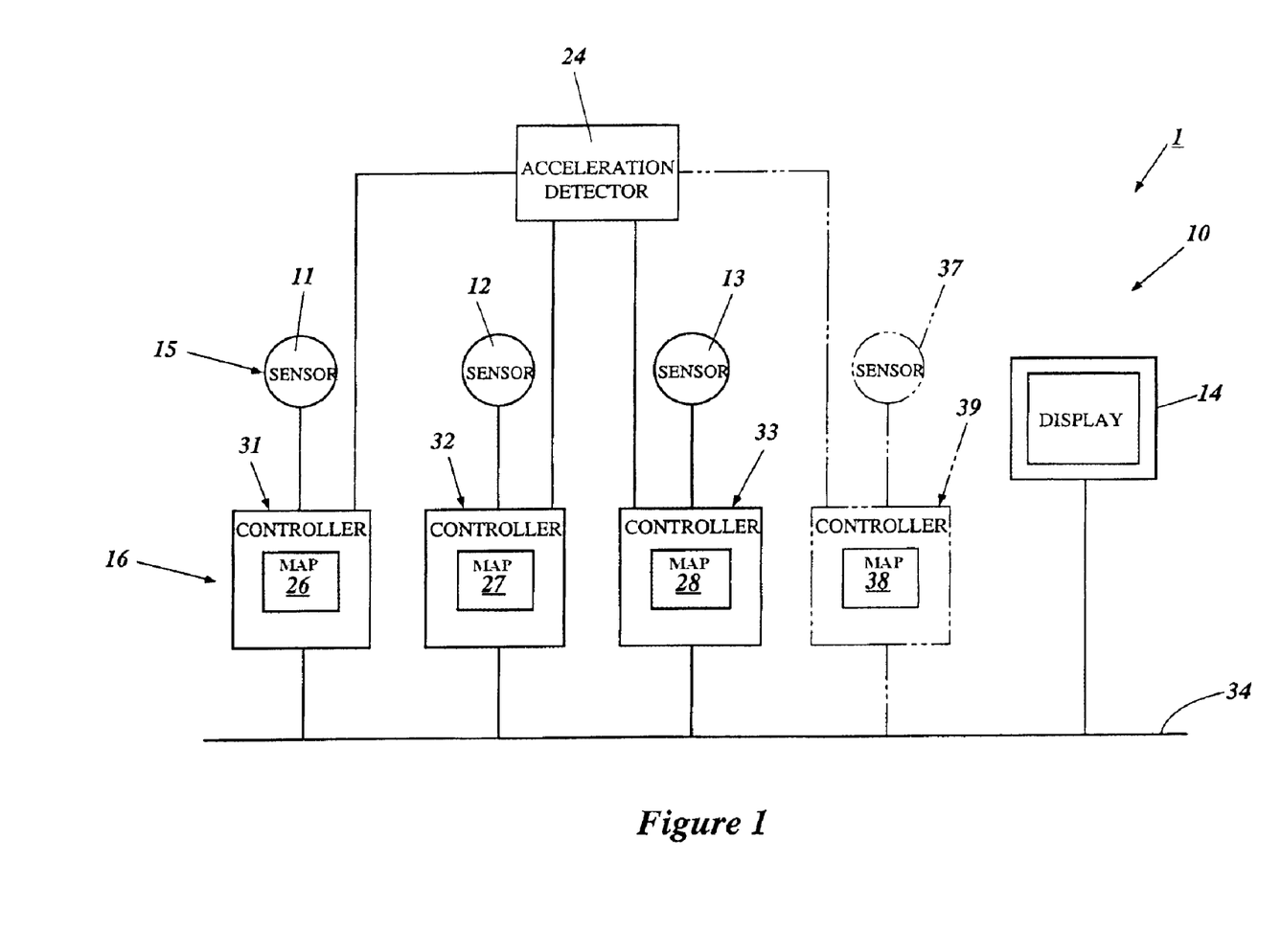
FIG. 1. is a wiring diagram of a vehicle speed display device.

FIG. 1 is a wiring diagram that depicts in greater detail one embodiment of a speed display device 10, such as one that might be used on the boat 2 in FIG. 2.

The speed display device 10 depicted in FIG. 2 includes a system of moving state detectors 15 for detecting the moving state of the vehicle 1. The moving state detectors 15 detect moving speed and/or the acceleration of the vehicle 1 as the moving state of the vehicle 1. In the embodiment depicted in FIG. 2, the moving state detectors 15 include three speed sensors 11, 12, 13, which will be described in greater detail below, and an acceleration sensor 24. FIG. 2 also depicts the possible addition of a fourth speed sensor 37, which will be described in greater detail below.

The speed display device 10 also includes a selector system 16 that receives signals indicative of detected speed values (v) detected by the speed sensors 11, 12, 13 and that selects a speed value to display to the operator of the vehicle 1 based on the moving state of the vehicle 1 detected by the moving state detectors 15.

The boat 2 also has a display 14 for displaying the selected speed value selected by the selector system 16 as the moving speed V of the vehicle 1 to the operator, based, at least in part, on detected speed values (m/s) (detection signals) from the speed sensors 11, 12, 13.

In the embodiment shown, the moving state detectors 15 of the speed display device 10 include first to third speed sensors 11, 12, 13 of different types for detecting the moving speed of the boat 2 by different detection methods. In other embodiments, the vehicle 1 has a different number of speed sensors. Speed values detected by the individual speed sensors 11, 12, 13 may differ one from another at any given time due at least in part to known levels of inaccuracy that are characteristic of the different types of speed sensors when operating under different moving state conditions, such when the vehicle 1 is traveling at various speed levels and/or at various acceleration levels.

In the embodiment shown in FIG. 1, the first speed sensor 11 is actuated by a radio wave signal transmitted from a global positioning system (GPS). In one embodiment, the first speed sensor 11 has a receiver for receiving radio waves from a plurality of satellites, for example four satellites, via an antenna 18 attached to the hull 5 of the boat 2. The GPS sensor 11 uses the received radio wave signals to detect the moving speed V or position of the boat 2.

The second speed sensor 12 in FIG. 1 is a paddle wheel type sensor. As depicted in FIG. 2, the paddle wheel sensor 12 has a paddle wheel 20 that is rotated by the resistance of a flow of water 3 created when the boat 2 is propelled, magnets 21 attached to the blades of the paddle wheel 20, and a Hall element 22 for converting the rotation of the magnets 21, which rotated together with the paddle wheel 20, into pulse signals. The paddle wheel sensor 12 uses the rotational speed of the paddle wheel 20 to detect the moving speed of the boat 2.

The third speed sensor 13 of the embodiment illustrated in FIG. 1 is a picot tube sensor, which detects the moving speed of the boat 2 based on a difference (dynamic pressure) between the total pressure which the sensor 13 receives from the water 3 when the boat 2 is propelled and a static pressure.

The moving state detectors 15 include one or more speed sensors. The speed sensors may be of the types described above or of one or more other types. For example, the moving state detectors may include an electromagnetic type speed sensor.

The moving state detectors 15 may also include one or more acceleration detector system 24 for detecting the acceleration $(m/s^2)$ of the boat 2. The acceleration detector system 24 may be an acceleration sensor or an acceleration calculation system which detects changes in speed over time to calculate the acceleration of the vehicle 1.

The selector system 16 of the speed display device 10 depicted in FIG. 1 includes control units 31, 32, 33 that are electrically connected to the first to third speed sensors 11, 12, 13, respectively, and to the acceleration detector system 24. Each control unit 31, 32, 33 stores a map 26, 27, 28 of errors corresponding to the type of speed sensor 11, 12, 13 to which it is electrically connected. Each map 26, 27, 28 depicts average errors known to be characteristic, under various conditions, of the type of speed sensor 11, 12, 13 to which the map 26, 27, 28 corresponds, as will be described in greater detail with reference to FIGS. 3-5.

In the embodiment depicted in FIG. 1, the display 14 and the maps 26, 27, 28 in the control units 31 to 33 are connected by a bus-type local area network (LAN) 34 with a high-speed broadband line, so that distributed processing can be achieved. This is advantageous since the degree of freedom of the control method between the display 14 and the maps 26, 27, 28 in the control units 31 to 33 is high and control units and their associated speed sensors can be easily added to or removed from the vehicle speed display device 10. The LAN 34 may be a star-type or a ring type. In other embodiments, other methods of networking the control units 31, 32, 33, error maps 26, 27, 28 and the display 14 may be used, as will be familiar to one of skill in the art.

Figure 4:
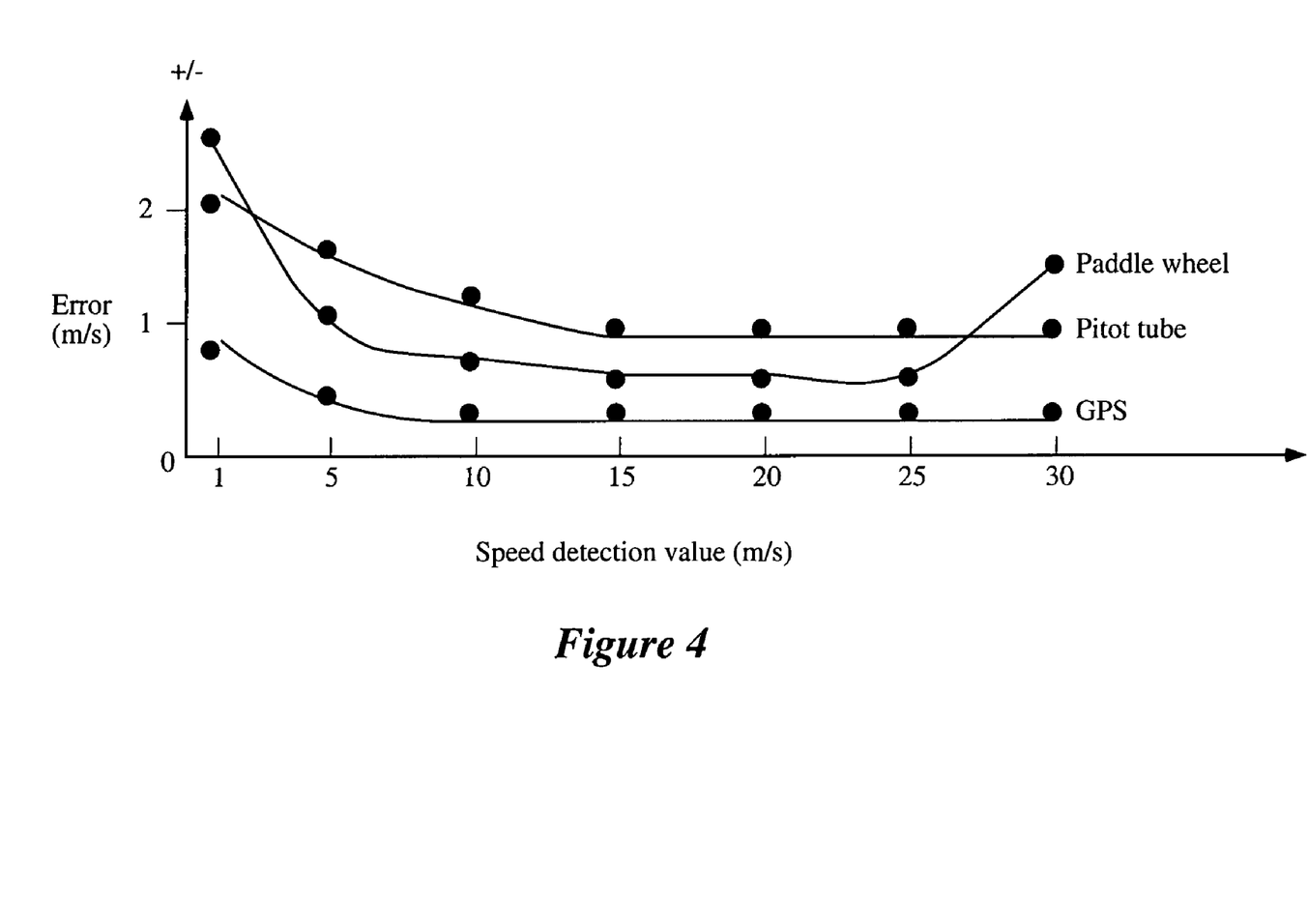
FIG. 4 is a graph showing the general relation between the detected speed values of a vehicle and the errors in the detected speed values.

The errors in the detected speed values detected by the first to third speed sensors will be described with reference to FIGS. 4 and 5. FIG. 4 is a sample graph showing errors (meters per second (m/s)) in the detected speed values (m/s) detected by the speed sensors 11, 12, 13 of FIG. 2 when the boat 2 is moving at a generally constant speed, without acceleration or deceleration. As shown in FIG. 4, the errors in the detected speed values detected by the first speed sensor 11 using a GPS are smaller than those in the detected speed values detected by the paddle wheel and third speed sensors 12,13. The errors in the detected speed values detected by the paddle wheel speed sensor are smaller than the errors in the detected speed values detected by the picot tube speed sensor over almost the entire moving speed range. However, when the boat is moving at a low speed (1 m/s), since turbulent flows tend to be created in the water, the error in the detection value detected by the paddle wheel speed sensor is greater than the error in the detection value detected by the picot tube speed sensor. Furthermore, when the boat is planning on the surface of water at a high speed (e.g., 30 m/s), the error in the detected speed value is greater than the error in the detected speed value detected by the picot tube speed sensor because the paddle wheel speed sensor tends to be separated from the surface of water.

Figure 5:
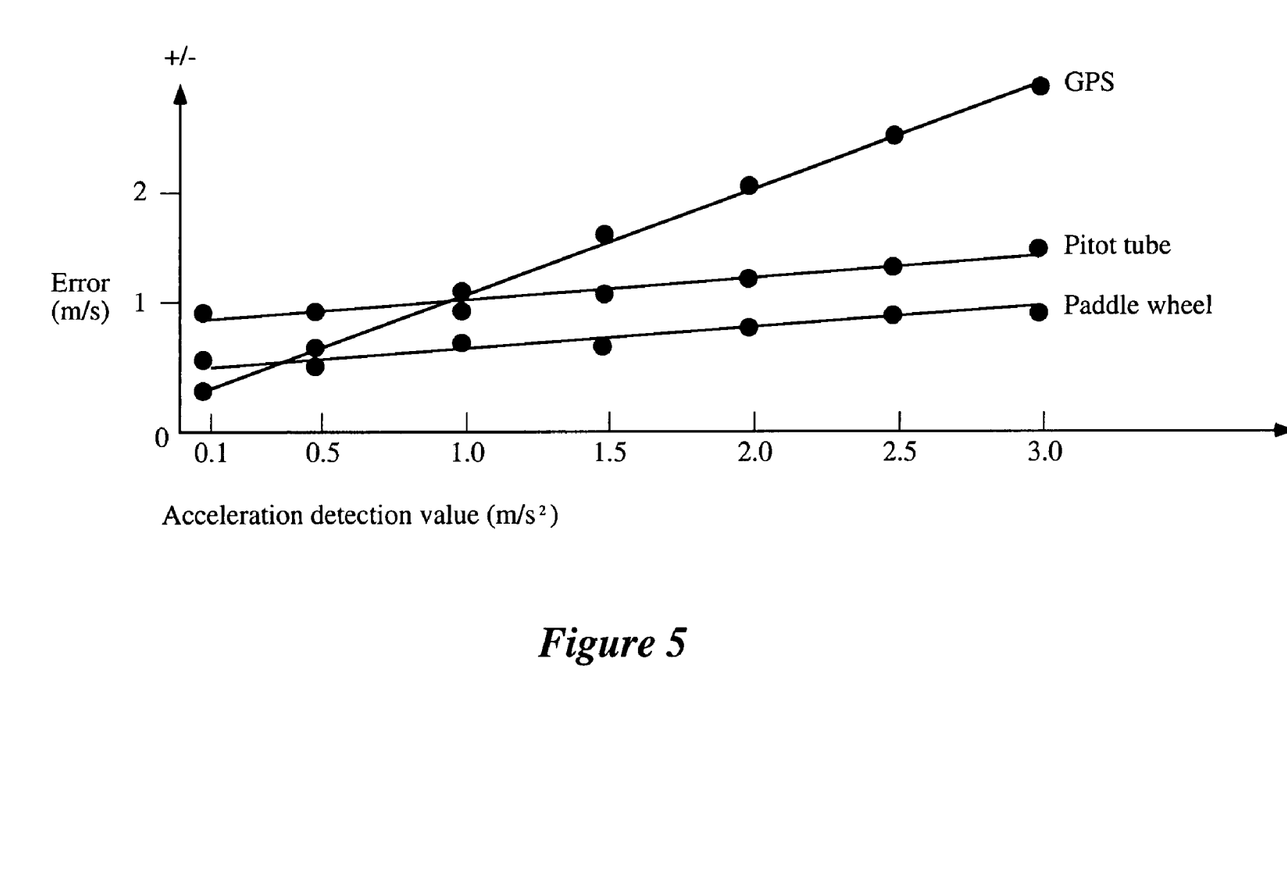
FIG. 5 is a graph showing the general relation between the detected acceleration values of a vehicle and the errors in the detected speed values.

FIG. 5 is a sample graph showing the relation between the acceleration (m/s$^2$) of the vehicle 1 and errors (m/s) in the detected speed values detected by the speed sensors 11, 12, 13.

The first speed sensor using a GPS has a slower response than the second and third speed sensors since the receiver on the vehicle receives a radio wave signal from a GPS satellite and the speed data are updated about once per second. Thus, as shown in FIG. 5, as the acceleration is greater, the error in the detected speed value detected by the first speed sensor is greater than those in the detection values detected by the second and third speed sensors. Thus, although at a constant speed, the GPS sensor performs more accurately than the paddle wheel or picot tube sensors, acceleration of the vehicle 1 is a factor that can adversely affect the performance of the GPS sensor. The interplay of effects of speed and acceleration on the accuracy of vehicle speed sensors is something that would be difficult for a normal operator of a vehicle to assess while maneuvering the vehicle.

Table 1 is one embodiment of a map of errors for a speed sensor in table form. Table 1 shows an example of a map 26 that corresponds to a GPS-type speed sensor 11 and that shows average error values that have been observed for the sensor 11 at various detected speed and acceleration levels. For example, the map 26 shows that at a detected speed of 5 m/s and a detected acceleration of 0.5 m/s$^2$, the GPS-type speed sensor 11 has an estimated error of 1.1 m/s.

TABLE 1

| Error Map | | Detected speed value m/s | | | | | |
|---|---|---|---|---|---|---|---|
| | | 5 | 10 | 15 | 20 | 25 | 30 |
| Detected acceleration value (m/s$^2$) | 0.5 | 1.1 | 0.7 | 0.6 | 0.6 | 0.6 | 1.6 |
| | 1 | 1.2 | 0.8 | 0.7 | 0.7 | 0.7 | 1.7 |
| | 1.5 | 1.3 | 0.9 | 0.8 | 0.8 | 0.8 | 1.8 |
| | 2 | 1.4 | 1 | 0.9 | 0.9 | 0.9 | 1.9 |
| | 2.5 | 1.5 | 1.1 | 1 | 1 | 1 | 2 |
| | 3 | 1.6 | 1.2 | 1.1 | 1.1 | 1.1 | 2.1 |

Figure 3:
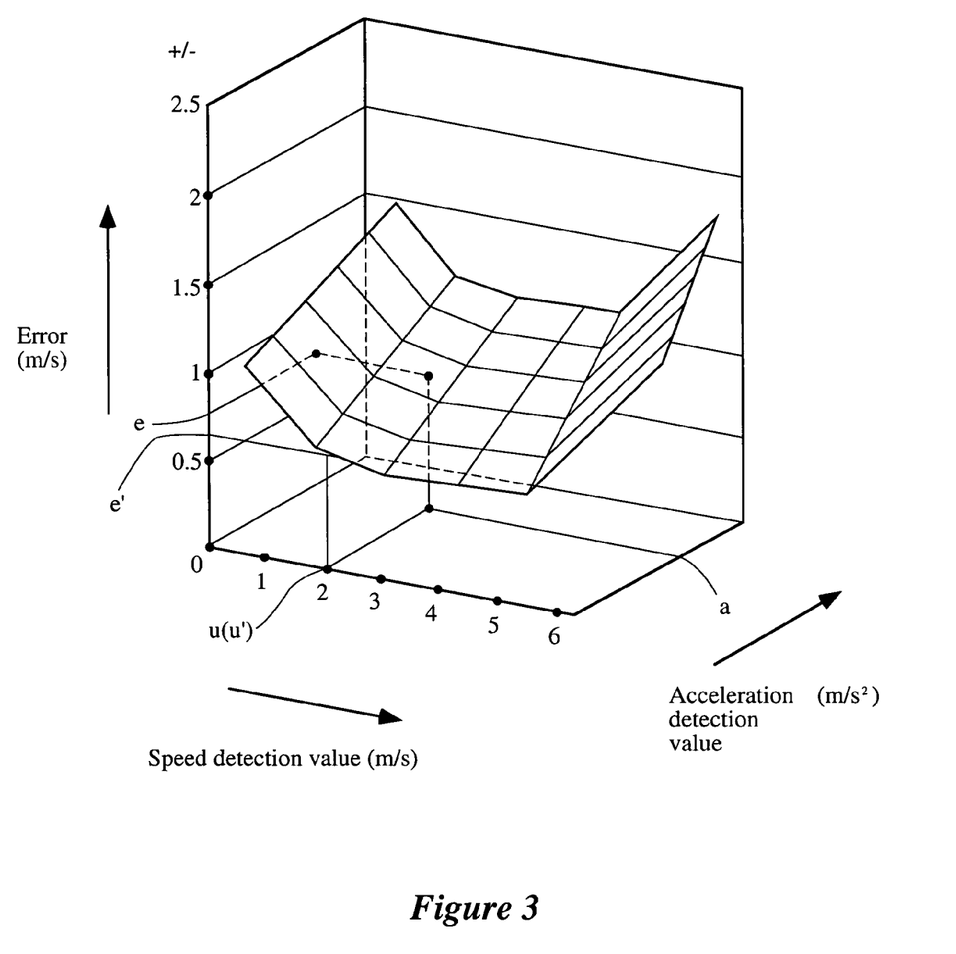
FIG. 3 is a graph of a error map used by the speed display device of FIG. 1.

FIG. 3 depicts the information of the first map 26 in Table 1 in graph form. The second and third error maps 27-28, which are not shown, corresponding to the second and third speed sensors 12-13, are of the same type as the first map 26 for the first speed sensor 11.

In other embodiments, the error maps may provide average errors that have been observed for a given type of sensor 11 various detected speeds without correspondence to acceleration levels. As will be familiar to one of skill in the art, in other embodiments, error maps may be formatted in a variety of different forms.

In one embodiment, when the boat 2 is moving, errors (e) are obtained from the first to third maps 26, 27, 28 based on detected speed values (v) detected actually by the first to the third speed sensors 11, 12, 13 and on a detected acceleration value (a) detected actually by the acceleration detector system 24. A minimum error (e) is selected from the errors (e) by the selector system 16 and a speed value is displayed as the moving speed V of the vehicle 1 on the display 14 based on the detected speed value (v) that corresponds to the minimum error (e), for example, the detected speed value (v) detected by the first speed sensor 11.

In another embodiment, although the detected speed values (v) are detected by the first, second and third speed sensors 11, 12, 13, the errors (e) may be obtained from the first to third maps 26, 27, 28 using a detected speed value (v) detected by one of the first, second, and third speed detection sensors 11, 12, 13. For example, the speed value detected by the first speed sensor 11, together with the detected acceleration value (a), can be used to determine the error (e) associated with each speed sensor from the respective maps 26, 27, 28. The selector system then selects the output from the sensor having the lowest error value (e) for the given running condition as the data to display to the operator.

The errors (e) for the speed sensors 11-13 may also be obtained using a calculated arithmetic value (v'), such as an average of the speed values (v) detected by two or more of the speed sensors 11, 12 and 13. The average speed value (v') may then be used in conjunction with the detected acceleration value (a) and with the first to third maps 26-28 to identify the speed sensor associated with the minimum error value (e). The detected speed value (v) of the identified sensor may then be selected by the selector system 16 to be displayed to the operator of the vehicle 1.

In various embodiments, the maps 26, 27, 28 and the selector 16 may be partially or entirely disposed in the display 14, integrated in one or more of the control units 31, 32, 33, and/or in another structure in communication with the moving state detectors 15 and the display 14.

In a further variation, a speed value may be displayed as the moving speed V of the vehicle 1 on the display 14 based on the minimum value of the errors (e'), which are obtained from the first to third maps 26, 27, 28, based only on one or more of the detected speed values (v) (or an average value or a calculated value based thereof) without taking the detected acceleration value (a).

Alternatively, a speed value may be displayed as the moving speed V of the vehicle 1 on the displaying device 14 based on one of the detected speed values detected by the first to third speed sensors 11, 12, 13, which is selected based only on a detected acceleration value (a) detected actually by the acceleration detector system 24. For example, when the detected acceleration value (a) is small, the detected speed value of the first speed sensor 11 is selected since it has a small error. When the detected acceleration value (a) is large, the detected speed value of either the second speed sensor 12 or the third second speed sensor 13 is selected since they have a relatively small error.

Accordingly, the vehicle speed display device 10 preferably has a plurality of speed sensors 11, 12, 13 of different types for detecting the moving speed V of a vehicle 1 by different detection methods. A display 14 displays the moving speed V of the vehicle 1 based on the speed value detected by the speed sensors 11, 12, 13. The vehicle speed display device 10 can also comprise a moving state detectors 15 for detecting the moving state of the vehicle 1 and a selector system 16 for selecting one of the detected speed values (v) detected by the speed sensors 11, 12, 13 based on the moving state of the vehicle 1 detected by the moving state detectors 15. The display 14 thus displays a speed value as the moving speed V of the vehicle 1 based on the selected detected speed value (v). The displayed value preferably is selected so as to have the highest accuracy, thereby providing the operator of the vehicle with more accurate information regarding the vehicle's speed (or other moving state data). This is advantageous for the operator of the vehicle 1, such as a boat, in maneuvering the vehicle 1 at various speeds and conditions. Since conditions such as the current moving speed V or acceleration of the vehicle 1 are taken into account when the moving state detectors 15 selects one of the speed values detected by the speed sensors 11, 12, 13, a detected speed value (v) with high accuracy can be selected.

In some embodiments, as described above, the minimum error (e') is selected from the errors (e') in the maps 26, 27, 28 corresponding to the speed values detected by the speed sensors 11, 12, 13 based on at least one of the speed values (v) detected by the moving state detecting speed sensors 11, 12, 13 or on an arithmetic value (v') calculated from at least two of the speed values (v) detected by the speed sensors 11, 12, 13. A speed value preferably is displayed as the moving speed V of the vehicle 1 on the display 14 based on the detected speed value (v) corresponding to the minimum error (e').

In one embodiment, if two or more detected speed values are determined to be associated with the minimum error, the selector system 16 may calculate a selected speed value based at least in part on the two or more detected speed values. For example, an arithmetic mean value of the two or more detected speed values may be calculated and selected to be the selected speed value for display to the operator of the vehicle.

As described in connection with several of the example given above, the control units 31, 32 33 in which the maps 26, 27, 28 are stored, respectively, preferably are provided separately for each of the moving state detecting speed sensors 11, 12, 13. The errors (e or e') associated with each of the speed sensors 11, 12, 13 are obtained from the maps 26, 27, 28, respectively, based on the detected speed values (v) detected by the moving state detecting speed sensors 11, 12, 13 or the arithmetic value (v') in conjunction with the detected acceleration value (a) detected by the acceleration detector system 24. Thus, any of the control units 31, 32, 33, in which the maps 26, 27, 28 are stored can be easily removed together with the corresponding speed sensor. Also, when desired, a new speed sensor 37, such as, for example, an electromagnetic sensor, can be easily added to the speed display device 10, together with a control unit 39 in which a map 38 corresponding to the speed sensor 37 is stored, as shown in double-dot-dash lines in FIG. 1. This is advantageous since the speed display device 10 can be easily modified.

As described before, one of the moving state detecting speed sensors is activated by a radio wave signal from a GPS. The detected speed value (v) detected by the first speed sensor 11 using a GPS has a relatively small error over a wide range of the moving speed V. Thus, when the minimum error (e or e') is selected from the errors (e or e') for the speed sensors 11, 12, 13 in the first to third maps 26, 27, 28 based on the detected speed value (v) detected by the moving state detecting first speed sensor 11, the selection is made with high accuracy and the operator can know the actual moving speed V of the vehicle accurately from the speed value displayed on the display 14.

As described before, in one embodiment, the vehicle 1 is a boat 2, and one of the moving state detecting speed sensors has a paddle wheel 20 which is rotated by resistance of a flow of water 3 created when the boat 2 is propelled and detects the moving speed V of the vehicle 1 by detecting the rotational speed of the paddle wheel 20. The detected speed value detected by the paddle wheel 20 type second speed sensor 12 is relative to the surface of the water 3 on which the vehicle 1 is moving. Thus, when the second speed sensor 12 is used to detect the moving state of the vehicle 1 and the minimum error (e or e') is selected from the errors (e or e') for the first to third speed sensors 11, 12, 13 in the maps 26, 27, 28 based on the detected speed value detected by the speed sensor, the selection is made with high accuracy and the operator can know the actual moving speed V of the vehicle relative to the surface of the water 3 accurately from the speed value displayed on the display 14.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof.

What is claimed is:

1. A vehicle speed display device, comprising:
    a plurality of moving state detectors for detecting the moving state of a vehicle, at least some of the plurality of moving state detectors being of a different type so as to detect information about the moving state of the vehicle using different detection methods, at least one of the moving state detectors configured to provide acceleration information about the vehicle;
    a selector system for selecting a speed value for display to an operator of the vehicle, wherein the selected speed value is determined by the selector system being configured to select a speed value to accurately represent the moving speed of the vehicle, wherein the selection is based at least in part on the acceleration information about the vehicle; and
    a display that displays the selected speed value as the moving speed of the vehicle.

2. The vehicle speed display device as set forth in claim 1, wherein at least one of the moving state detectors detects the moving speed of the vehicle as the moving state of the vehicle, and wherein the selected speed value is determined based at least in part on the detected moving speed.

3. The vehicle speed display device as set forth in claim 1, wherein the display and the selector system are connected by a LAN.

4. A vehicle speed display device, comprising:
a plurality of moving state detectors for detecting the moving state of a vehicle, at least some of the plurality of moving state detectors being of a different type so as to detect information about the moving state of the vehicle using different detection methods, wherein the plurality of moving state detectors includes at least two different speed sensors;
a selector system for selecting a speed value for display to an operator of the vehicle, wherein the selected speed value is determined by the selector system being configured to select a speed value to accurately represent the moving speed of the vehicle based at least in part on the moving state information detected by one or more of the moving state detectors, wherein the selector system includes one or more maps of errors which correlate detected speed values detected by the different types of speed sensors with estimated error values, and the selector system is configured to select a speed value for display based at least in part on a minimum error value corresponding to at least one detected speed value detected by the speed sensors; and
a display that displays the selected speed value as the moving speed of the vehicle.

5. The vehicle speed display device as set forth in claim 4, wherein one of the speed sensors is actuated by a radio wave signal from a global positioning system (GPS).

6. The vehicle speed display device as set forth in claim 4, wherein the vehicle is a watercraft and one of the speed sensors has a paddle wheel.

7. The vehicle speed display device as set forth in claim 4, wherein one of the speed sensors is a pitot tube sensor.

8. The vehicle speed display device as set forth in claim 4, wherein one of the speed sensors is an electromagnetic sensor.

9. The vehicle speed display device as set forth in claim 4, wherein the selector system is configured to select a speed value that is detected by at least one of the speed sensors and is associated with a minimum error value in the one or more maps.

10. The vehicle speed display device as set forth in claim 4, wherein the selector system is configured to select a speed value that is detected by at least one of the speed sensors and is associated with a minimum error corresponding to an arithmetic value calculated from at least two detected speed values.

11. The vehicle speed display device as set forth in claim 4, wherein:
the plurality of moving state detectors further include at least one acceleration detector to detect the acceleration of the vehicle;
the maps of errors used by the selector system further correlate the detected speed values and the estimated error values with at least one detected acceleration value; and
the selector system further selects a speed value for display based at least in part on a minimum error value corresponding to the detected speed values detected by the speed sensors and corresponding to an acceleration value detected by the at least one acceleration detector.

12. The vehicle speed display device as set forth in claim 11, wherein one of the speed sensors is actuated by a radio wave signal from a global positioning system (GPS).

13. The vehicle speed display device as set forth in claim 11, wherein the vehicle is a boat and one of the speed sensors has a paddle wheel.

14. The vehicle speed display device as set forth in claim 11, wherein one of the speed sensors is a pitot tube sensor.

15. The vehicle speed display device as set forth in claim 11, wherein one of the speed sensors is an electromagnetic sensor.

16. A vehicle speed display device, comprising:
a plurality of moving state detectors for detecting the moving state of a vehicle, at least some of the plurality of moving state detectors being of a different type so as to detect information about the moving state of the vehicle using different detection methods;
a selector system for selecting a speed value for display to an operator of the vehicle, wherein the selected speed value is determined by the selector system being configured to select a speed value to accurately represent the moving speed of the vehicle based at least in part on the moving state information detected by one or more of the moving state detectors, wherein one or more speed sensors and one or more associated error maps are configured to be readily added to and/or removed from the vehicle speed display device; and
a display that displays the selected speed value as the moving speed of the vehicle, wherein the display and the selector system are connected by a LAN.

17. A vehicle speed display device, comprising:
at least two speed sensors, each sensor detecting a speed value for a vehicle, wherein each speed sensor is associated with an error map that indicates error levels for the speed sensor in various moving states;
a selector system configured to select a single speed value determined to be representative of an accurate moving speed of the vehicle based at least in part on the error map indications; and
a display device for displaying the single displayed speed value.

18. A vehicle speed display device, comprising:
at least two speed sensors, each sensor detecting a speed value for a vehicle;
a selector system configured to select a single speed value determined to be representative of an accurate moving speed of the vehicle based at least in part on the detected speed values;
a display device for displaying the single speed value; and
an acceleration detection system for detecting a detected acceleration value for said vehicle, wherein said selector system is further configured to select said single speed value based at least in part on said detected acceleration value.

19. A method for displaying a displayed speed value of a vehicle, said method comprising:
receiving from each of a plurality of speed sensors a detected speed value for a vehicle;
receiving a detected acceleration value for said vehicle;
determining a single displayed speed value for said vehicle, wherein said determination is based at least in part on said received detected speed values and on said detected acceleration value; and
displaying said single displayed speed value to an operator of said vehicle.

20. A method for displaying a speed value of a vehicle, said method comprising:

receiving from each of a plurality of speed sensors a detected speed value for a vehicle;

determining a single displayed speed value for said vehicle based at least in part on said received detected speed values, wherein determining a single displayed speed value comprises accessing maps of errors associated with said speed sensors to identify a received detected speed value that is associated with a minimum error value in said maps of errors, and selecting said identified detected speed value to be said single displayed speed value for said vehicle; and displaying said single speed value to an operator of said vehicle.

21. The method of claim 20, wherein accessing maps of errors further comprises:

receiving a detected acceleration value for the vehicle;

selecting one of said detected speed values; and using said selected detected speed value in conjunction with said detected acceleration value to determine an error value associated with said selected detected speed value for each of said maps of errors, wherein each map of errors is associated with one of said speed sensors;

identifying a minimum error value from amongst said determined error values in at least one of said maps of errors;

identifying the speed sensor associated with the map of errors associated with said minimum error value; and selecting the speed value detected by the identified speed sensor to be the identified detected speed value.

22. The method of claim 20, wherein accessing maps of errors further comprises:

receiving a detected acceleration value for the vehicle;

calculating an arithmetic value, based at least in part on at least two of said detected speed values; and using said arithmetic value in conjunction with said detected acceleration value to determine an error value associated with said arithmetic value for each of said maps of errors, wherein each map of errors is associated with one of said speed sensors;

identifying a minimum error value from amongst said determined error values in at least one of said maps of errors;

identifying the speed sensor associated with the map of errors associated with said minimum error value; and selecting the speed value detected by the identified speed sensor to be the identified detected speed value.

23. A method for displaying a speed value of a vehicle, said method comprising:

receiving from each of a plurality of speed sensors a detected speed value for a vehicle;

determining a single speed value for said vehicle based at least in part on said received detected speed values;

receiving at least one detected acceleration value for said vehicle;

accessing maps of errors associated with said speed sensors to identify a received detected speed value that is associated with a minimum error value in said maps of errors, based at least in part on said detected acceleration value; and selecting said identified detected speed value to be said single displayed speed value for said vehicle; and displaying said single speed value to an operator of said vehicle.

* * * * *

UNITED STATES PATENT AND TRADEMARK OFFICE
CERTIFICATE OF CORRECTION

| | | |
|---|---|---|
| PATENT NO. | : 7,424,349 B2 | Page 1 of 1 |
| APPLICATION NO. | : 10/983354 | |
| DATED | : September 9, 2008 | |
| INVENTOR(S) | : Takashi Okuyama | |

It is certified that error appears in the above-identified patent and that said Letters Patent is hereby corrected as shown below:

At column 1, line 27, change "picot" to --pitot--.

At column 3, line 14, change "FIG. 1." to --FIG. 1--.

At column 4, line 44, change "picot" to --pitot--.

At column 5, line 28, change "picot" to --pitot--.

At column 5, line 33, change "picot" to --pitot--.

At column 5, line 37, change "picot" to --pitot--.

At column 5, line 54, change "picot" to --pitot--.

Signed and Sealed this

Third Day of March, 2009

JOHN DOLL
*Acting Director of the United States Patent and Trademark Office*